Aug. 29, 1950 R. A. BEERS, JR 2,520,621

FREQUENCY DISCRIMINATOR

Filed May 31, 1949

Inventor

ROY A. BEERS, JR.

By H. L. Newton

Attorney

Patented Aug. 29, 1950 2,520,621

UNITED STATES PATENT OFFICE 2,520,621

FREQUENCY DISCRIMINATOR

Roy A. Beers, Jr., Audubon, N. J., assignor to Radio Corporation of America, a corporation of Delaware Application May 31, 1949, Serial No. 96,353

12 Claims. (Cl. 250—27)

Figures 1, 2:
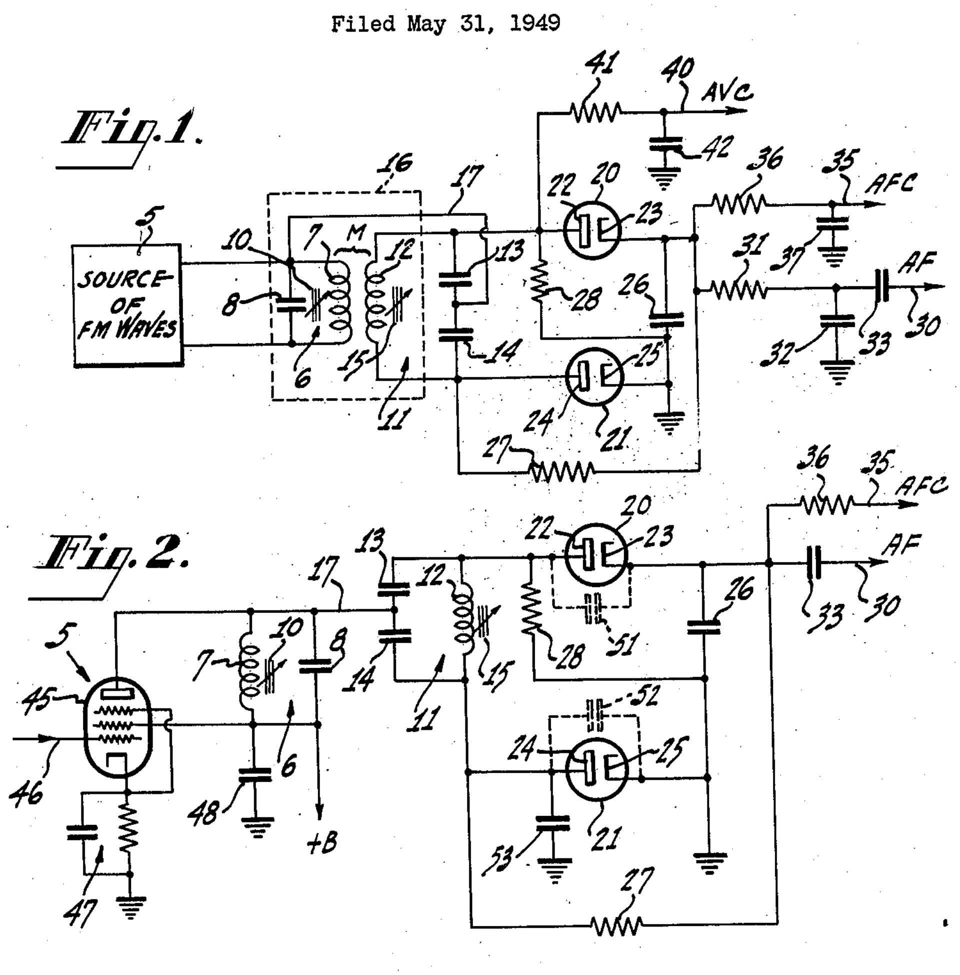

This invention relates to detectors for phase modulated or frequency modulated carrier waves and particularly to a frequency discriminator suitable, for example, for automatic frequency control circuits or for demodulating an angle modulated carrier wave.

The expression "angle modulated carrier waves" is meant to include both phase modulated and frequency modulated carrier waves as well as waves which are both phase and frequency modulated. It may be pointed out that the frequency modulated carrier waves transmitted by broadcast transmitters are of the latter type because the pre-emphasis provided for higher modulation frequencies produces a carrier wave partly frequency modulated and partly phase modulated. While a frequency modulated carrier wave is obtained by deviating the carrier wave with respect to its mean frequency to an extent proportional to the amplitude of the modulation frequency, a phase modulated carrier wave has a frequency deviation which increases with the modulation frequency.

The patent of Koch 2,410,983 granted on November 12, 1946 discloses a discriminator-rectifier circuit which may be considered an improvement in some respects over the Seeley discriminator disclosed and claimed in U. S. Patent 2,121,103 of June 21, 1938. The Koch discriminator has been designed to facilitate inductance tuning of the discriminator network. The discriminator network is followed by a pair of rectifiers, each having a load resistor shunting the respective rectifiers. It has been found, however, that the Koch discriminator presents difficulties in adjustment and furthermore the separation between the positive and negative frequency peaks and the center frequency of the discriminator curve is normally unequal. Accordingly, the discriminator curve is not as linear as may be desired.

It is accordingly an object of the present invention to provide a frequency discriminator which is an improvement over the Koch discriminator above referred to.

A further object of the invention is to provide a frequency discriminator which has an improved balance and a more equal separation between the center frequency and the positive and negative frequency peaks thereby providing a more linear discriminator curve.

The angle modulated carrier wave detector of the present invention comprises an improved discriminator network and rectifier circuit. The discriminator network is designed to derive from an angle modulated carrier wave a pair of carrier wave voltages whose relative magnitudes are dependent upon the angular modulations of the input carrier wave. Although the discriminator network may take various forms it has been found that the discriminator or angular modulated carrier wave detector of the invention will operate particularly well with the discriminator network disclosed by Koch and having magnetic coupling between the primary and secondary tuned circuits of the network.

The rectifier circuit following the discriminator network comprises two rectifiers each having an anode and a cathode. The rectifier anodes are connected to the discriminator network. A load resistor is provided for each rectifier and each load resistor is connected between the anode of one rectifier and the cathode of the other rectifier. The two cathodes of the rectifiers may be connected by a carrier wave bypass capacitor. An output circuit may, for example, be coupled across the two load resistors for adding the output voltages in opposition. This output signal may be utilized for deriving the modulation signal or for obtaining an automatic frequency control (AFC) voltage. Furthermore, an automatic gain control (AVC) voltage may be derived across one of the load resistors.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1 is a circuit diagram of a preferred frequency discriminator in accordance with the invention; and Figure 2 is a circuit diagram of a modified frequency discriminator embodying the invention.

Referring now to Figure 1 there is illustrated a frequency discriminator in accordance with the invention including source 5 of angle modulated or frequency modulated carrier waves (FM wave). Source 5 represents schematically any angle modulated carrier wave which is to be demodulated such as obtained from a radio receiver. The waves obtained from source 5 are impressed on primary resonant circuit 6 including inductor 7 across which is connected capacitor 8. The frequency of primary resonant circuit 6 preferably is adjusted by paramagnetic core 10 which may, for example, consist of comminuted iron or of a ferrite material. Secondary resonant circuit 11 includes inductor 12 shunted by capacitors 13 and 14 connected in series. Secondary resonant circuit 11 is also preferably tuned by paramagnetic core 15.

Resonant circuits 6 and 11 are inductively coupled as indicated at M. Furthermore, inductors 7, 12 and capacitor 8 may be enclosed by shield 16. Resonant circuits 6 and 11 are tuned to the same frequency. One side of primary resonant circuit 6 is conductively connected to the junction of capacitors 13, 14 by lead 17.

Resonant circuits 6 and 11 represent the discriminator network of the frequency discriminator of the invention. The discriminator network is identical with that illustrated in Figure 1 of the Koch patent above referred to and its operation is well understood. Thus, two carrier wave voltages are developed in secondary resonant circuit 11 by the inductive coupling between inductors 7 and 12. These two voltages are equal and 180 degrees out of phase at the terminals of inductor 12. The phases of these two carrier wave voltages are now compared with the phase of a reference carrier wave voltage which is the voltage injected through lead 17 into secondary resonant circuit 11. At the center frequency of the wave, that is, at the frequency to which both resonant circuits 6 and 11 are tuned, the reference voltage is 90 degrees out of phase with respect to the two voltages developed at the two terminals of inductor 12. Capacitors 13 and 14 present a small reactance to the carrier wave and therefore the reference voltage appears substantially unchanged in amplitude and phase at the terminals of inductor 12. However, when the frequency of the impressed wave deviates from the center frequency, the phase relation between the two inductively induced voltages and the reference voltage is no longer 90 degrees so that at the two terminals of inductor 12 resultant carrier wave voltages are developed having magnitudes which depend upon the angular modulations of the original carrier wave. Specifically, the amplitudes of the resultant carrier wave voltages are a function of phase deviations which in turn depend upon the angular modulations or frequency modulations of the impressed carrier waves.

The discriminator network above described is followed by a rectifier circuit including two rectifiers 20 and 21. Rectifiers 20 and 21 may, for example, consist of vacuum tube diodes as shown which may either have separate envelopes or a common envelope. Rectifier 20 has an anode 22 and a cathode 23 which rectifier 21 is provided with an anode 24 and a cathode 25. The two anodes 22 and 24 of the two rectifiers form the input electrodes and are connected individually to the terminals of inductor 12. The two cathodes 23 and 25 may be connected by capacitor 26 presenting a low impedance to carrier frequency currents but a high impedance to modulation frequency currents. Cathode 25 of rectifier 21 may be grounded as shown.

In accordance with the present invention, individual load resistors 27 and 28 are provided for rectifiers 20 and 21. Load resistor 27 for rectifier 20 is connected between cathode 23 of rectifier 20 and anode 24 of rectifier 21. Load resistor 28 for rectifier 21 is connected between cathode 25 of rectifier 21 and anode 22 of rectifier 20. Accordingly, the direct current path through rectifier 20 may be traced from cathode 23 through load resistor 27, inductor 12 and back to anode 22. The direct current path through diode 21 may be traced from cathode 25 through load resistor 28, inductor 12 and back to anode 24.

It will now be seen that cathode 25 is grounded while cathode 23 is grounded for carrier frequency currents. Accordingly, a voltage representative of the modulation frequency component and of the mean frequency of the carrier wave is developed across each load resistor 27 and 28. These voltages are added in opposition. The modulation frequency component is derived across load resistors 28 and 27 connected in series. The modulation frequency component which may be an audio frequency signal may be obtained from output lead 30. A de-emphasis network consisting of series resistor 31 and shunt capacitor 32 may be provided between output lead 30 and cathode 23 of rectifier 20. Coupling capacitor 33 may be provided in series with output lead 30.

It is also feasible to derive an AFC voltage from cathode 23. This voltage may be obtained from output lead 35 and a filter network consisting of series resistor 36 and shunt capacitor 37 may be provided between cathode 23 and output lead 35. Filter network 36, 37 removes the audio frequency component so that only a direct current voltage remains which is representative of the mean frequency of the impressed carrier wave compared to the resonant frequency of circuits 6 and 11.

It is also feasible to derive an AVC voltage from output lead 40 across one of the load resistors such as resistor 28. A filter network consisting of series resistor 41 and shunt capacitor 42 which is similar to network 36, 37 may be provided between anode 22 and output lead 40.

It has been found that due to the novel connection of load resistors 27 and 28 a better balanced frequency discriminator may be obtained. The discriminator curve is adjusted by an adjustment of primary resonant circuit 6 by means of core 10. When this adjustment is made in the Koch discriminator it has been found that the positive and negative frequency peaks are separated from the center frequency by +48 kc. (kilocycles) and −30 kc. respectively. With the same adjustment in the frequency discriminator of the invention the separation of the frequency peaks from the center frequency is +39 kc. and −30 kc. respectively. This will also improve the shape of the discriminator curve and make it more linear. It is to be understood, of course, that the discriminator curve may also be made linear over a wider frequency range if desired.

While it will be understood that the circuit specifications of the frequency discriminator of the invention may vary according to the design for any particular application, the following circuit specifications for a frequency discriminator are included, by way of example only, as suitable for a carrier frequency of 2.0 megacycles and for a frequency deviation of ±15 kc.:

Capacitor 8, 68 micromicrofarads
Capacitor 13, 82 micromicrofarads
Capacitor 14, 82 micromicrofarads
Capacitor 26, 56 micromicrofarads
Capacitor 32, .01 microfarad
Capacitor 33, .01 microfarad
Capacitor 37, .1 microfarad
Capacitor 42, .1 microfarad
Resistor 27, 100,000 ohms
Resistor 28, 100,000 ohms
Resistor 31, 47,000 ohms
Resistor 36, 1,000,000 ohms
Resistor 41, 1,000,000 ohms Referring now to Figure 2 there is illustrated a modified frequency discriminator in accordance with the invention. The main difference between the circuits of Figure 1 and Figure 2 is that resonant circuits 6 and 11 are capacitively coupled in the circuit of Figure 2. Source 5 has been shown, by way of example, in Figure 2 as pentode amplifier 45 which may, for example, be the last intermediate frequency amplifier stage of a radio receiver. The angle modulated carrier wave may be impressed through lead 46 on the control grid of the amplifier. The cathode of the amplifier may be biased by a network 47 consisting of a resistor shunted by a capacitor. The anode is connected to resonant circuit 6. The anode voltage supply indicated at +B may be connected to the lower terminal of resonant circuit 6 and may also be connected to the screen grid of the amplifier as shown. Bypass capacitor 48 may be provided between the lower terminal of resonant circuit 6 and ground.

Resonant circuits 6 and 11 are not inductively coupled but are only connected by lead 17 in the manner previously explained. Furthermore, resonant circuits 6 and 11 are capacitively coupled. Capacitors 13 and 14 form two arms of a capacitance bridge across which conductor 12 is connected. The other two arms of the capacitance bridge may be formed by capacitances 51 and 52 which are the interelectrode capacitances of rectifiers 20 and 21. In view of the small reactance of bypass capacitor 26 at the carrier frequency this capacitor may be disregarded in the following explanation.

If the capacitance bridge consisting of capacitors 13, 14, 51 and 52 is perfectly balanced, the voltages at anodes 22 and 24 with respect to ground will be equal for carrier waves of any frequency. In order to obtain a discriminator network, the capacitance bridge must be unbalanced. In other words, either capacitors 13 and 14 must be unequal or capacitors 51 and 52 must be unequal. However, capacitors 51 and 52 will normally be of equal values because rectifiers 20 and 21 will consist of identical tubes having the same interelectrode capacitance. It is accordingly feasible to make capacitors 13 and 14 unequal or alternatively capacitor 53 may be provided as shown between anode 24 of resistor 21 and ground. In this case, the fourth arm of the capacitance bridge consists of capacitors 52 and 53. It is, however, also feasible to connect capacitor 53 between anode 22 of rectifier 20 and ground.

The discriminator network of Figure 2 which has also been shown in the Koch patent referred to operates as follows. The voltages between anode 22 and ground and between anode 24 and ground are only equal at a certain frequency which is the resonant frequency of tuned circuit 11. As soon as the frequency of the input wave deviates from this value the voltage of anode 22 with respect to ground will increase while the voltage between anode 24 and ground will decrease or vice versa. Since the two voltages are added in opposition through load resistors 28 and 27 the output voltage derived across the two load resistors will resemble the conventional discriminator curve.

The modulation frequency voltage may again be obtained from output lead 30 through coupling capacitor 33. De-emphasis network 31, 32 has been omitted in Figure 2. The AFC voltage may also be obtained from output lead 35 through filter resistor 36. Audio bypass capacitor 37 has been omitted. It is also to be understood that an AVC voltage may be obtained across load resistor 28 as previously described.

The circuit of Figure 2 may have the same circuit constants as that of Figure 1 and the capacitance of capacitor 53 may amount to 5 micromicrofarads.

Although the frequency discriminator of the present invention will work with many of the well known discriminator networks it has been found that particularly good results are obtained with the circuit of Figure 1.

There has thus been disclosed a frequency discriminator which is an improvement over the discriminator disclosed in the Koch patent previously referred to. The discriminator is distinguished by its ease of adjustment and will give a better balance than the Koch discriminator. The discriminator curve is more nearly linear and the separation between the center frequency and the two frequency peaks is more nearly equal.

What is claimed is:

1. In combination with a source of angle modulated carrier waves, a discriminator network for deriving from the waves a pair of carrier wave voltages whose relative magnitudes are dependent upon the angular modulations of the waves, two rectifiers, each having an input electrode and an output electrode, circuit connections between said discriminator network and the input electrodes of said rectifiers for impressing said voltages on respective ones of said rectifiers, an impedance element connected between the output electrodes of said rectifiers, and a load resistor for each of said rectifiers, each of said load resistors being directly connected between the input electrode of one rectifier and the output electrode of the other rectifier.

2. In combination with a source of angle modulated carrier waves, a discriminator network for deriving from the waves a pair of carrier wave voltages whose relative magnitudes are dependent upon the angular modulations of the waves, two rectifiers, each having an input electrode and an output electrode, circuit connections between said discriminator network and the input electrodes of said rectifiers for impressing said voltages on respective ones of said rectifiers, a capacitor connected between the output electrodes of said rectifiers, a load resistor for each of said rectifiers, each of said load resistors being directly connected between the input electrode of one rectifier and the output electrode of the other rectifier, and an output connection coupled across at least one of said load resistors.

3. In combination with a source of angle modulated carrier waves, a discriminator network for deriving from the waves a pair of carrier wave voltages whose relative magnitudes are dependent upon the angular modulations of the waves, two rectifiers, each having an input electrode and an output electrode, circuit connections between said discriminator network and the input electrodes of said rectifiers for impressing said voltages on respective ones of said rectifiers, a load resistor for each of said rectifiers, each of said load resistors being directly connected between the input electrode of one rectifier and the output electrode of the other rectifier, a carrier wave bypass capacitor connected between the output electrodes of said rectifiers, and an output circuit connected across said load resistors.

4. An angle modulated carrier wave detector comprising a discriminator network for deriving from an angle modulated carrier wave a pair of carrier wave voltages whose relative magnitudes are a function of phase deviations dependent upon the angular modulations of the carrier wave, two rectifiers, each having an input electrode and an output electrode, circuit connections between said discriminator network and the input electrodes of said rectifiers for impressing said voltages on respective ones of said rectifiers, an impedance element connected between the output electrodes of said rectifiers, and a load resistor for each of said rectifiers, each of said load resistors being directly connected between the input electrode of one rectifier and the output electrode of the other rectifier.

5. An angle modulated carrier wave detector comprising a discriminator network for deriving from an angle modulated carrier wave a pair of carrier wave voltages whose relative magnitudes are a function of phase deviations dependent upon the angular modulations of the carrier wave, two rectifiers, each having an input electrode and an output electrode, circuit connections between said discriminator network and the input electrodes of said rectifiers for impressing said voltages on respective ones of said rectifiers, a capacitor connected between the output electrodes of said rectifiers, a load resistor for each of said rectifiers, each of said load resistors being directly connected between the input electrode of one rectifier and the output electrode of the other rectifier, and an output connection coupled across at least one of said load resistors.

6. An angle modulated carrier wave detector comprising a discriminator network for deriving from an angle modulated carrier wave a pair of carrier wave voltages whose relative magnitudes are a function of phase deviations dependent upon the angular modulations of the carrier wave, two rectifiers, each having an input electrode and an output electrode, circuit connections between said discriminator network and the input electrodes of said rectifiers for impressing said voltages on respective ones of said rectifiers, a load resistor for each of said rectifiers, each of said load resistors being directly connected between the input electrode of one rectifier and the output electrode of the other rectifier, a carrier wave bypass capacitor connected between the output electrodes of said rectifiers, and an output circuit across said load resistors.

7. The combination with a source of frequency modulated carrier waves of a frequency discriminator comprising a frequency discriminator network for deriving from the waves a pair of carrier wave voltages whose relative magnitudes are a function of the frequency of said waves, two rectifiers, each having an input electrode and an output electrode, circuit connections between said discriminator network and the input electrodes of said rectifiers for impressing said voltages on respective ones of said rectifiers, an impedance element connected between the output electrodes of said rectifiers, and a load resistor for each of said rectifiers, each of said load resistors being directly connected between the input electrode of one rectifier and the output electrode of the other rectifier.

8. The combination with a source of frequency modulated carrier waves of a frequency discriminator comprising a frequency discriminator network for deriving from the waves a pair of carrier wave voltages whose relative magnitudes are a function of the frequency of said waves, two rectifiers, each having an anode and a cathode, circuit connections between said discriminator network and the anodes of said rectifiers for impressing said voltages on respective ones of said rectifiers, a load resistor for each of said rectifiers, each of said load resistors being directly connected between the anode of one rectifier and the cathode of the other rectifier, a carrier wave bypass capacitor connected between the cathodes of said rectifiers, and an output circuit connected across at least one of said load resistors.

9. A frequency discriminator comprising a first resonant circuit, a second resonant circuit tuned to the frequency of said first circuit, said second circuit comprising an inductor shunted by two series-connected capacitors, a conductive connection between one side of said first circuit and the junction of said two capacitors, means for reactively coupling said resonant circuits, two rectifiers, each having an anode and a cathode, said anodes being connected individually to the terminals of said inductor, a capacitor connected between the cathodes of said rectifiers, two load resistors, each being directly connected between the anode of one of said rectifiers and the cathode of the other one of said rectifiers, and an output circuit connected across at least one of said load resistors.

10. A frequency discriminator comprising a first resonant circuit, a second resonant circuit tuned to the frequency of said first circuit, said second circuit comprising an inductor shunted by two series connected capacitors, a conductive connection between one side of said first circuit and the junction of said two capacitors, means for inductively coupling said resonant circuits, two rectifiers, each having an anode and a cathode, said anodes being connected individually to the terminals of said inductor, an impedance element connected between the cathodes of said rectifiers, two load resistors, each being directly connected between the anode of one of said rectifiers and the cathode of the other one of said rectifiers, and an output circuit connected across at least one of said load resistors.

11. A frequency discriminator comprising a first resonant circuit, a second resonant circuit tuned to the frequency of said first circuit, said second circuit comprising an inductor shunted by two series connected capacitors, a conductive connection between one side of said first circuit and the junction of said two capacitors, means for inductively coupling said resonant circuits, two rectifiers, each having an anode and a cathode, said anodes being connected individually to the terminals of said inductor, two load resistors, each being directly connected between the anode of one of said rectifiers and the cathode of the other one of said rectifiers, a carrier wave bypass capacitor connected between the cathodes of said rectifiers, and an output circuit connected across at least one of said load resistors.

12. A frequency discriminator comprising a first resonant circuit, a second resonant circuit tuned to the frequency of said first circuit, said second circuit comprising an inductor shunted by two series connected capacitors, a conductive connection between one side of said first circuit and the junction of said two capacitors, means for capacitively coupling said resonant circuits, two rectifiers, each having an anode and a cathode, said anodes being connected individually to the terminals of said inductor, two load resistors, each being directly connected between the anode of one of said rectifiers and the cathode of the other one of said rectifiers, a carrier wave bypass capacitor connected between the cathodes of said rectifiers, and an output circuit connected across at least one of said load resistors.

ROY A. BEERS, Jr.

REFERENCES CITED

The following references are of record in the file of this patent:

UNITED STATES PATENTS

| Number | Name | Date |
|---|---|---|
| 2,353,468 | Holst et al. | July 11, 1944 |
| 2,410,983 | Koch | Nov. 12, 1946 |
| 2,467,035 | Huxtable | Apr. 12, 1949 |